United States Patent
Kim et al.

(10) Patent No.: US 9,579,946 B2
(45) Date of Patent: Feb. 28, 2017

(54) TRAILING ARM BUSH FOR COUPLED TORSION BEAM AXLE

(71) Applicants: Hyundai Motor Company, Seoul (KR); Kia Motors Corporation, Seoul (KR)

(72) Inventors: Sang-Rak Kim, Yongin-shi (KR); Jung-Taek Lim, Kwangmyoung shi (KR); Chul-Ha Hwang, Suwon-shi (KR); Kyong-Sik Youn, Hwasung-shi (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/563,653

(22) Filed: Dec. 8, 2014

(65) Prior Publication Data
US 2015/0183290 A1 Jul. 2, 2015

(30) Foreign Application Priority Data
Dec. 31, 2013 (KR) ........................ 10-2013-0167984

(51) Int. Cl.
*B60G 21/05* (2006.01)
(52) U.S. Cl.
CPC ........... *B60G 21/051* (2013.01); *B60G 21/052* (2013.01); *B60G 2200/20* (2013.01); *B60G 2204/1434* (2013.01); *B60G 2204/41* (2013.01); *B60G 2204/41042* (2013.01)
(58) Field of Classification Search
CPC . B60G 21/051; B60G 21/052; B60G 2204/41; B60G 2204/4104; B60G 2204/41042; B60G 2204/1434
See application file for complete search history.

(56) References Cited

U.S. PATENT DOCUMENTS

| | | | | |
|---|---|---|---|---|
| 4,258,820 A * | 3/1981 | Miura | ................. | B60G 99/004 180/295 |
| 4,548,666 A * | 10/1985 | Mathieu | .................... | B61F 5/08 105/199.4 |
| 5,022,673 A * | 6/1991 | Sekino | ..................... | B60G 3/20 280/124.138 |
| 5,026,090 A * | 6/1991 | Sekino | ................... | B62D 17/00 267/189 |

(Continued)

FOREIGN PATENT DOCUMENTS

| | | |
|---|---|---|
| JP | 10-082413 (A) | 3/1998 |
| JP | 2010-202033 (A) | 9/2010 |
| KR | 10-2012-0045273 (A) | 5/2012 |

*Primary Examiner* — Barry Gooden, Jr.
(74) *Attorney, Agent, or Firm* — Morgan, Lewis & Bockius LLP (57) ABSTRACT

A trailing arm bush may include a cylindrical outer pipe, an inner pipe inserted to a central portion of the outer pipe at an interval, a first bush rubber unit, a second bush rubber unit and a third bush rubber unit that connect between an inner peripheral surface of the outer pipe and an outer peripheral surface of the inner pipe, respectively, a hollow void part formed between the inner peripheral surface of the outer pipe and the outer peripheral surface of the inner pipe, and a stopper attached to the inner peripheral surface of the outer pipe and disposed among the first bush rubber unit, the second bush rubber unit and the third bush rubber unit.

4 Claims, 6 Drawing Sheets

(56) References Cited

U.S. PATENT DOCUMENTS

| | | | | |
|---|---|---|---|---|
| 5,295,671 | A * | 3/1994 | Nakagaki | F16F 13/10 248/638 |
| 6,030,016 | A * | 2/2000 | Rice | B60G 99/004 296/35.1 |
| 6,095,481 | A * | 8/2000 | Norkus | B60G 99/004 248/560 |
| 6,371,461 | B1 * | 4/2002 | Stahl | F16F 1/387 267/140.12 |
| 6,389,923 | B1 * | 5/2002 | Barton | B62D 1/185 280/777 |
| 6,398,200 | B1 * | 6/2002 | Kakimoto | B60G 21/052 267/140.12 |
| 7,021,613 | B2 * | 4/2006 | Mikami | B60G 21/0551 267/140.12 |
| 2002/0114661 | A1 * | 8/2002 | Bohne | F16C 11/0614 403/141 |
| 2003/0218287 | A1 * | 11/2003 | Mikami | B60G 21/0551 267/293 |
| 2004/0113337 | A1 | 6/2004 | Landry, Jr. | |
| 2005/0179179 | A1 * | 8/2005 | Imaeda | B60G 7/02 267/140.12 |
| 2005/0200064 | A1 * | 9/2005 | Klein | F16F 1/3849 267/293 |
| 2006/0033300 | A1 * | 2/2006 | Shin | B60G 21/052 280/124.107 |
| 2007/0145657 | A1 * | 6/2007 | Funano | B60G 21/052 267/293 |
| 2012/0175831 | A1 * | 7/2012 | Kieffer | F16F 1/3828 267/292 |
| 2013/0065505 | A1 * | 3/2013 | Yoskowitz | F24F 13/1406 454/317 |
| 2014/0205455 | A1 * | 7/2014 | Kuroki | B63H 23/34 416/134 R |
| 2014/0299736 | A1 * | 10/2014 | Itou | B60G 13/003 248/611 |
| 2015/0183290 | A1 * | 7/2015 | Kim | B60G 21/051 280/124.128 |

\* cited by examiner

TRAILING ARM BUSH FOR COUPLED TORSION BEAM AXLE

CROSS-REFERENCE TO RELATED APPLICATION

The present application claims priority to Korean Patent Application No. 10-2013-0167984 filed on Dec. 31, 2013, the entire contents of which is incorporated herein for all purposes by this reference.

BACKGROUND OF THE INVENTION

Field of the Invention

The present invention relates to a trailing arm bush for CTBA that connects between a pair of trailing arms supported by a torsion beam disposed in a vehicle width direction and a vehicle body, and more particularly, to a trailing arm bush for CTBA in which by forming three bush rubber units for connecting between an inner peripheral surface of an outer pipe and an outer peripheral surface of the inner pipe, a bush rubber unit can have characteristics of a non-linear spring when the inner pipe moves back and forth by external vibration of the vehicle, and a gap between the inner pipe and a stopper is secured to significantly improve an abnormal noise generation phenomenon.

Description of Related Art

In general, a suspension system of the vehicle is constituted by various devices for improving the riding comfort of the vehicle, such as, a chassis spring that connects an axle and a vehicle body to alleviate impact receiving from a road surface during running, a shock absorber for absorbing a free vibration of the spring, and a stabilizer for preventing the vehicle from rolling from side to side.

Such a suspension system is classified into a front wheel suspension system and a rear wheel suspension system depending on mounting parts of the vehicle, and is classified into an integral axle suspension type in which left and right wheels are connected to each other by one axle, and an independent suspension type that is connected to the left and right wheels so as to be independently operable.

Since the independent suspension type is able to lighten the lower weight of the spring and lower the bottom of the vehicle body, riding comfort is good, and grounding characteristics and steering stability are excellent. Thus, it is mainly widely used in passenger cars or the like.

Meanwhile, in recent years, as the suspension systems of medium and small-sized cars, application of a Coupled Torsion Beam Axle (CTBA) type suspension system which has a simple structure, can be reduced in weight, has the small number of required components, and has excellent workability has expanded.

Generally, the CTBA type suspension system is a type of a torsion beam axle, and is called a twist beam suspension or a coupled link.

Such a CTBA type suspension system is constituted by a trailing arm which is treated as a rigid link and on which all the parts are mounted, a torsion beam that mainly controls the effect on the rolling behavior of a vehicle and serves to restrain the movement of the trailing arm relative to roll stiffness and left and right lateral force, and a trailing arm bush for CTBA that alleviates the vibration and shock from the ground surface.

The CTBA type suspension system having such a configuration is characterized in that there are two supporting points connected to the vehicle body smaller than other suspension systems, but directions of the input load are diverse, and values of relatively large sizes are input.

Therefore, there are great changes in performance of the vehicle depending on the performance of the trailing arm bush for CTBA, and the trailing arm bush for CTBA will occupy an important role in terms of riding comfort and driving stability of the vehicle.

Figure 1:
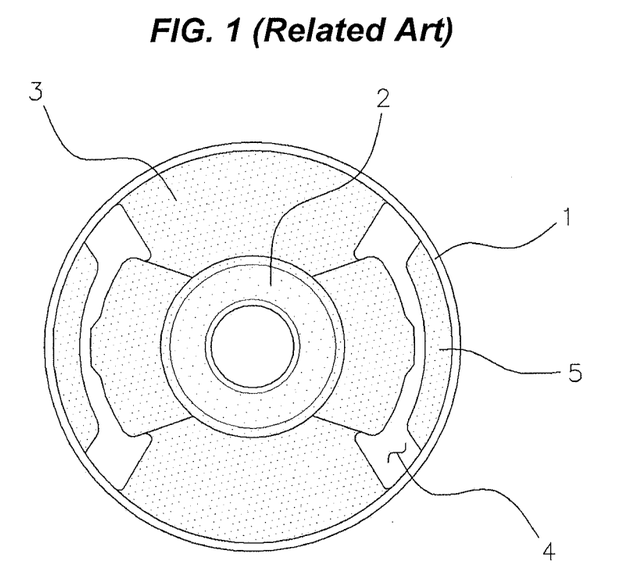
FIG. 1 is a front view showing a conventional two-bridge type trailing arm bush for CTBA.
Figure 2:
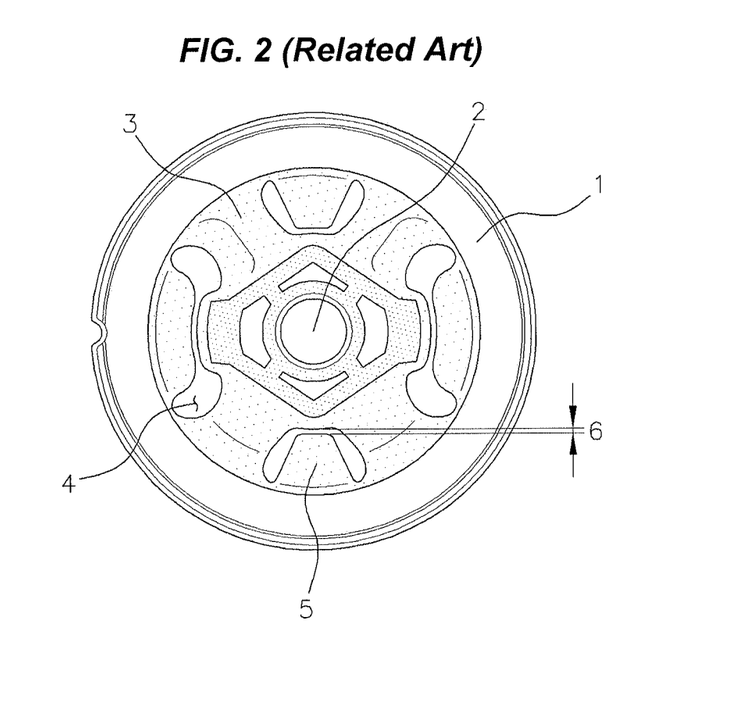
FIG. 2 is a front view showing a conventional four-bridge type trailing arm bush for CTBA.

As shown in FIGS. 1 and 2, the structure of the trailing arm bush for CTBA according to the related art has a form in which a bush rubber unit 3 and a void part 4 are provided between the outer pipe 1 and the inner pipe 2, and a stopper 5 is attached to the inner peripheral surface of the outer pipe 1.

As shown in FIG. 1, a so-called two-bridge type trailing arm bush for CTBA configured to connect two parts between the outer pipe 1 and the inner pipe 2 has good characteristics in terms of handling of the vehicle and durability of the bush, but there is a disadvantage in that riding comfort of the vehicle is lowered to induce Impact harshness.

Meanwhile, as shown in FIG. 2, a so-called four-bridge type trailing arm bush for CTBA configured to connect four parts between the outer pipe 1 and the inner pipe 2 has an advantage in that the riding comfort is excellent as compared to the two-bridge type, but has a disadvantage in terms of handling of the vehicle and durability of the bush.

That is, since handling and riding comfort of the vehicle are inversely proportional to the trailing arm bush for CTBA, there is a need for trade-off between two characteristics at the time of actual design, but there is a problem in that it is very difficult to optimize the trailing arm bush for CTBA while satisfying both two characteristics.

Thus, there are problems such as prolonged development period and consumption of extra development costs due to the extra number of tests, when developing a trailing arm bush for CTBA depending on the design of the conventional trailing arm bush for CTBA.

Furthermore, as shown in FIG. 2, since the conventional trailing arm bush for CTBA is primarily designed so that a very small gap 6 of 0.5 mm is formed between the stopper 5 and the inner pipe 2, and the four-bridge type trailing arm bush for CTBA has the spring characteristics of the six-bridge type, there is a problem in that a lot of abnormal noises occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a trailing arm bush for CTBA in which both handling and riding comfort of the vehicle are improved and the occurrence of abnormal noise is significantly reduced, by developing a three-bridge type trailing arm bush for CTBA in which a shape of a bush rubber unit for connecting between the outer pipe and the inner pipe is changed and an external stopper is mounted to one end of the inner pipe.

In an aspect of the present invention, a trailing arm bush for CTBA (Coupled Torsion Beam Axle) that connects between a pair of trailing arms supported by a torsion beam disposed in a vehicle width direction and a vehicle body, may include a cylindrical outer pipe configured to be coupled to one side of the trailing arm, an inner pipe inserted to a central portion of the outer pipe at an interval, a first bush rubber unit, a second bush rubber unit and a third bush rubber unit that connect between an inner peripheral surface of the outer pipe and an outer peripheral surface of the inner pipe, respectively, a hollow void part formed between the inner peripheral surface of the outer pipe and the outer peripheral surface of the inner pipe, and a stopper attached to the inner peripheral surface of the outer pipe and disposed among the first bush rubber unit, the second bush rubber unit and the third bush rubber unit, wherein when the inner pipe is moved in a front-to-back direction due to external vibration of a vehicle, angles of the first bush rubber unit, the second bush rubber unit and the third bush rubber unit formed together with the inner pipe change, and wherein the trailing arm bush for CTBA may have characteristics of a non-linear spring.

The first bush rubber unit is disposed in front of the inner pipe.

The second bush rubber unit forms a predetermined angle together with the first bush rubber unit and is disposed above the inner pipe, wherein the third bush rubber unit forms a predetermined angle together with the first bush rubber unit and is disposed below the inner pipe, and wherein the second bush rubber unit and the third bush rubber unit are disposed vertically symmetrically on a basis of the inner pipe.

The inner pipe is formed in a circular pipe shape, wherein each corner of the first bush rubber unit, the second bush rubber unit and the third bush rubber unit is rounded.

The inner pipe is formed in a triangular pipe shape, and each corner of the first bush rubber unit, the second bush rubber unit and the third bush rubber unit is formed in chamfered shape.

The trailing arm bush for CTBA may include an external stopper that may have a disc unit having a diameter equal to the outer peripheral surface of the outer pipe, and a cylindrical unit coupled to the disc unit and having a relatively smaller diameter than the inner peripheral surface of the outer pipe, wherein the external stopper is mounted on one end of the inner pipe.

A recessed part is recessed in response to shapes of the first bush rubber unit, the second bush rubber unit and the third bush rubber unit, wherein a protruding part protruding in response to a shape of the void part are formed on the cylindrical unit, and wherein the recessed part and the protruding part are alternately disposed.

The present invention having the configuration as described above has an effect in which the bush rubber unit has characteristics of the non-linear spring when the inner pipe is moved in a front-to-back direction by the external vibration of the vehicle, by forming the bush rubber unit for connecting between the inner peripheral surface of the outer pipe and the outer peripheral surface of the inner pipe by a three-bridge type constituted by the first bush rubber unit to the third bush rubber unit.

That is, since the bush rubber unit is formed symmetrically on the basis of the inner pipe, the conventional trailing arm bush for CTBA has characteristics of a linear spring, and thus, it is not possible to satisfy both handling and riding comfort of the vehicle. Meanwhile, since the bush rubber unit is formed asymmetrically on the basis of the inner pipe, the trailing arm bush for CTBA according to the present invention can have characteristics of a non-linear spring, and thus, there is an effect of being able to satisfy both handling and riding comfort.

Therefore, the trailing arm bush for CTBA according to the present invention is able to prevent the prolonged development period of the trailing arm bush for CTBA according to the excessive number of tests, and prevent the consumption of the excessive development costs in development of the trailing arm bush for CTBA.

Further, there is an effect of significantly reducing the occurrence of abnormal noise, by securing a maximum separation distance between the outer peripheral surface of the inner pipe and the stopper to limit the role of the stopper to large displacement prevention.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of a door outside handle for vehicle according to an exemplary embodiment of the present invention will be described hereafter in detail with reference to the accompanying drawings.

Hereinafter, the present invention will be described in detail with reference to the accompanying drawings to allow those skilled in the art to easily implement. However, the present invention may be implemented in several different forms and is not limited to the exemplary embodiments set forth herein.

In order to clearly describe the present invention, parts not related to the description were omitted, and the same or similar elements are denoted by the same reference numerals throughout the specification.

Furthermore, terms or words used in the specification and claims should not be construed as being limited to general or dictionary meanings, and should be construed as meanings and concepts conforming to the technical spirits of the present invention, based on a principle that the inventors can suitably define concepts of the terms in order to describe the invention in the best way.

A trailing arm bush for CTBA according to an exemplary embodiment of the present invention is a trailing arm bush for CTBA that connects between a pair of trailing arms supported by a torsion beam disposed in a vehicle width direction and a vehicle body, including: a cylindrical outer pipe 10 coupled to one side of the trailing arm, an inner pipe 20 inserted to the central portion of the outer pipe 10 at an interval, a first bush rubber unit 30 to a third bush rubber unit 34 that connect between an inner peripheral surface of the outer pipe 10 and an outer peripheral surface of the inner pipe 20, respectively, a hollow void part 40 formed between the inner peripheral surface of the outer pipe and the outer peripheral surface of the inner pipe 20, and a stopper 50 attached to the inner peripheral surface of the outer pipe 10 and disposed among the first bush rubber unit 30 to the third bush rubber unit 34, wherein when the inner pipe 20 is moved in a front-to-back direction due to external vibration of the vehicle, angles of the first bush rubber unit 30 to the third bush rubber unit 34 formed together with the inner pipe 20 change, and the trailing arm bush for CTBA has characteristics of a non-linear spring accordingly.

Basically, the CTBA type suspension system has a structure in which a pair of trailing arms is inserted to both ends of the torsion beam extending in the vehicle width direction and is integrally connected by a method such as welding, one end of the trailing arm is equipped with a trailing arm bush for CTBA and fastened to the vehicle body by a bolt or the like, and left and right wheels are connected to the other end thereof.

Figure 3:
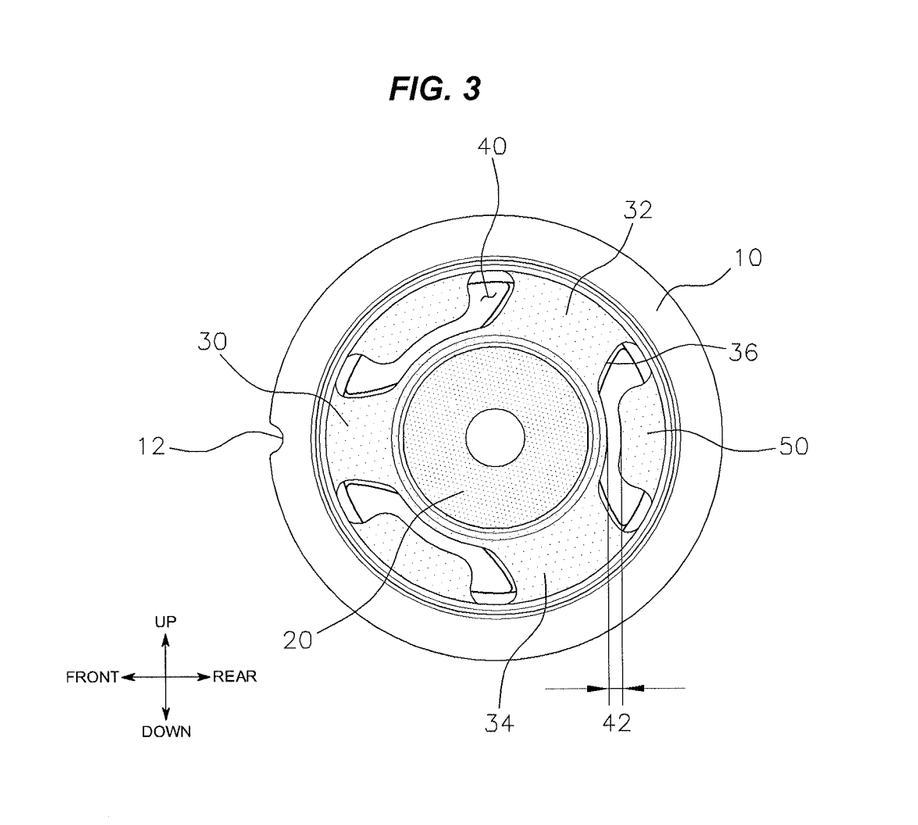
FIG. 3 is a front view showing an aspect of a trailing arm bush for CTBA according to an exemplary embodiment of the present invention.
Figure 4:
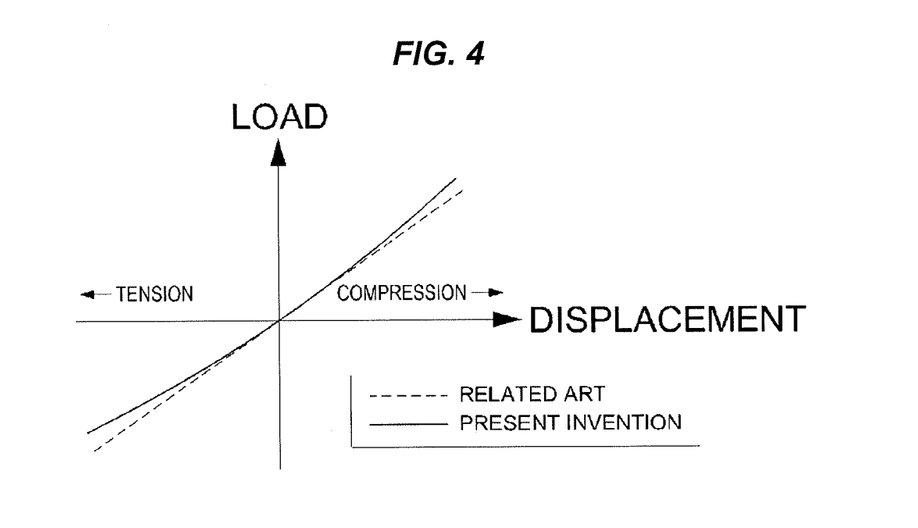
FIG. 4 is a graph showing spring characteristics of the trailing arm bush for CTBA according to an exemplary embodiment of the present invention and the conventional trailing arm bush for CTBA.

FIG. 3 is a front view illustrating an aspect of the trailing arm bush for CTBA according to an exemplary embodiment of the present invention, and FIG. 4 is graph showing the spring characteristics of the trailing arm bush for CTBA according to an exemplary embodiment of the present invention and the conventional trailing arm bush for CTBA.

As shown in FIG. 3, the outer pipe 10 is formed in a circular pipe shape, and the inner pipe 20 is inserted into the central axis of the outer pipe 10 at a regular interval spaced apart from the outer pipe 10.

Although it is not shown, the outer pipe 10 serves to provide a coupling surface so that the trailing arm bush for CTBA can be mounted on one side of the trailing arm, and the inner pipe 20 is connected to the vehicle body.

As shown in FIG. 3, a first bush rubber unit 30, a second bush rubber unit 32, and a third bush rubber unit 34 made of an elastic material are formed between the inner peripheral surface of the outer pipe 10 and the outer peripheral surface the inner pipe 20.

Further, the hollow void part 40 is formed between the inner peripheral surface of the outer pipe 10 and the outer peripheral surface of the inner pipe 20, and a stopper 50 made of an elastic material is attached to the inner peripheral surface of the outer pipe 10.

In the shown embodiment, the void part 40 and the stopper 50 are formed between the first bush rubber unit 30 and the second bush rubber unit 32, between the second bush rubber unit 32 and the third bush rubber unit 34, and between the third bush rubber unit 34 and the first bush rubber unit 30, respectively.

As shown in FIG. 3, the first bush rubber unit 30 extends from the front of the inner pipe 20 to the inner peripheral surface the outer pipe 10, the second bush rubber unit 32 is disposed over the inner pipe 20 while forming at a predetermined angle together with the first bush rubber unit 30, and the third the bush rubber unit 34 is disposed below the inner pipe 20 while forming a predetermined angle together with the first bush rubber unit 30.

For example, the first bush rubber unit 30, the second bush rubber unit 32, and the third bush rubber unit 34 form an angle of 120°, respectively, and are radially disposed on the basis of the inner pipe 20, and the void part 40 and the stopper 50 also form an angle of 120°, respectively, and are radially disposed on the basis of the inner pipe 20.

Of course, the longitudinal direction and the vertical direction of the trailing arm bush for CTBA are arbitrarily defined for convenience of description, and those skilled in the art can understand that in the case of the bush rubber unit disposed in the trailing arm bush for CTBA mounted on the other trailing arm of the pair of trailing arms, the disposition direction changes on the contrary to that described above.

As shown in FIG. 3, the inner pipe 20 is formed in a circular pipe shape, and each corner of the first bush rubber unit 30 to the third bush rubber unit 34 is preferably rounded 36.

That is, the first bush rubber unit 30 to the third bush rubber unit 34 are characterized in that they are formed in a shape similar to a rectangular parallelepiped as a whole, and each corner is rounded 36.

In the shown embodiment, it is preferred that a maximum distance be spaced between the outer peripheral surface of the inner pipe 20 and the stopper 50, i.e., a maximum gap 42 be formed between the inner pipe 20 and the stopper 50.

As described above, the gap 6 between the inner pipe 2 and the stopper 5 in the conventional trailing arm bush for CTBA is minimized to about 0.5 mm, and thus, the four-bridge type trailing arm bush for CTBA implements the spring characteristics such as a six-bridge type in which the four bush rubber units and two stoppers 5 are added. Meanwhile, in the trailing arm bush for CTBA according to an exemplary embodiment of the present invention, the maximum gap 42 between the inner pipe 20 and the stopper 50 is secured to limit the stopper 50 so as to be able to only serve as the large displacement prevention.

In the trailing arm bush for CTBA according to an exemplary embodiment of the present invention, by securing the maximum gap 42 between the inner pipe 20 and the stopper 50, it is possible to significantly reduce the frequency of the abnormal noise generated by the excessive collision of the inner pipe 20 with the stopper 50.

As shown in FIG. 4, it is possible to understand that since that the first bush rubber unit 30, the second bush rubber unit 32, and the third bush rubber unit 34 are formed in a left-right asymmetrical form, the trailing arm bush for CTBA according to an exemplary embodiment of the present invention has the characteristics of the non-linear spring, unlike the conventional trailing arm bush for CTBA.

That is, the angle formed by the second bush rubber unit 32 and the third bush rubber unit 34 together with the inner pipe 20 changes according to tension or compression of the first bush rubber unit 30, and the tension or compression characteristics of the first bush rubber unit 30, the second bush rubber unit 32, and the third bush rubber unit 34 are asymmetrically formed, and thus, the trailing arm bush for CTBA has characteristics of the non-linear spring.

By designing the trailing arm bush for CTBA to have the characteristics of the non-linear spring as described above, the designer of the trailing arm bush for CTBA is able to easily design a trailing arm bush for CTBA capable of satisfying both riding comfort and handling of the vehicle, and in an exemplary embodiment of the present invention, an external stopper 60 to be described later is applied by the reflection of such a design.

Figure 5A:
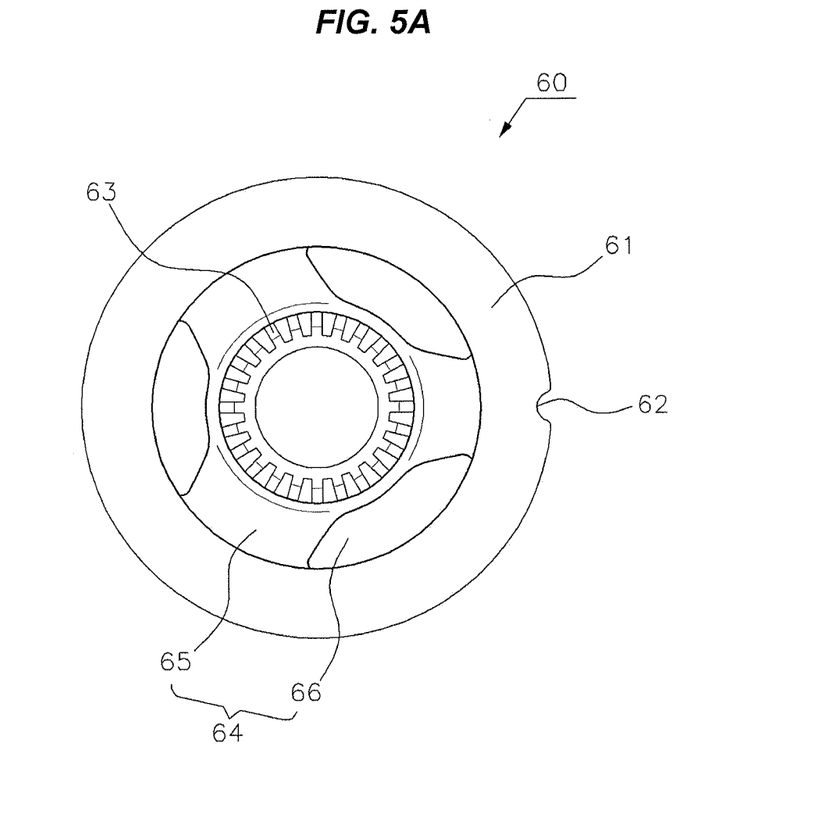
FIG. 5A is a rear view showing an aspect of an external stopper according to an exemplary embodiment of the present invention.
Figure 5B:
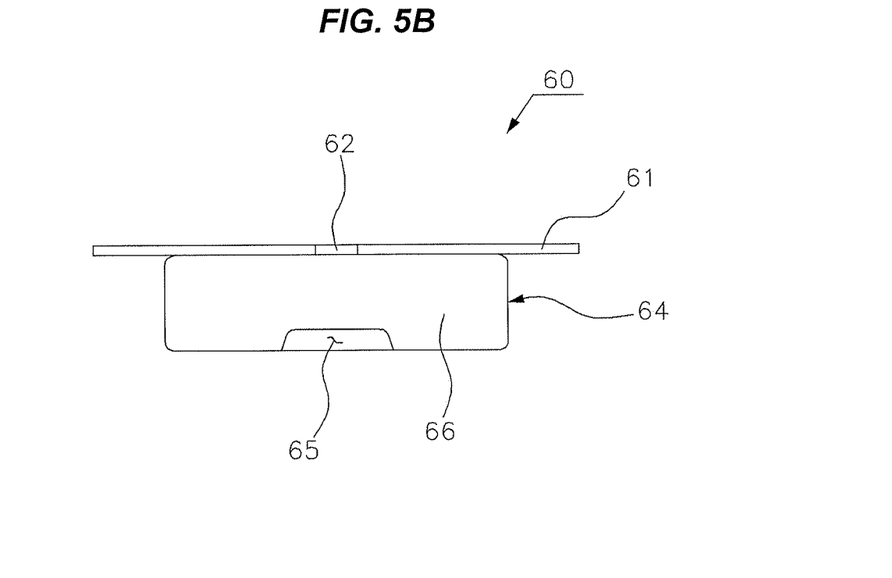
FIG. 5B is a side view showing an aspect of an external stopper according to an exemplary embodiment of the present invention.
Figure 6:
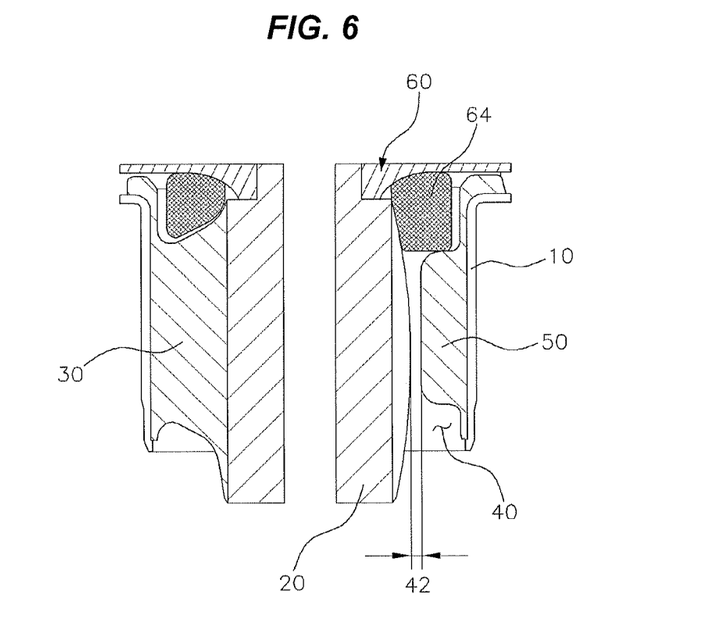
FIG. 6 is a cross-sectional view showing an aspect in which the external stopper is coupled to the trailing arm bush for CTBA according to an exemplary embodiment of the present invention.

FIG. 5A is a rear view illustrating an aspect of the external stopper 60 according to an exemplary embodiment of the present invention, FIG. 5B is a side view illustrating an aspect of the external stopper 60 according to an exemplary embodiment of the present invention, and FIG. 6 is a cross-sectional view showing an aspect in which the external stopper 60 is coupled to the trailing arm bush for CTBA according to an exemplary embodiment of the present invention.

As shown in FIGS. 5A to 6, the external stopper 60 is coupled to one end of the inner pipe 20, and at the central portion of the external stopper 60, a fastening unit 63 is formed so as to be capable of being coupled to the inner pipe 20.

Specifically, as shown in FIG. 5B, the external stopper 60 is configured to include a disc unit 61 having a diameter equal to the outer diameter of the outer pipe 10, and a cylindrical unit 64 coupled to the disc unit 61 and having a relatively smaller diameter than the inner diameter of the outer pipe 10.

The cylindrical unit 64 serves as a stopper that is inserted into the outer pipe 10 and comes into contact with the inner pipe 20, the cylindrical unit 64 is preferably formed of a rubber to which oleic acid is added.

As shown in FIGS. 5A and 5B, on the cylindrical unit 64, a recessed part 65 recessed in response to the shapes of the first bush rubber unit to the third bush rubber unit so that interference with the first bush rubber unit to the third bush rubber unit of the trailing arm bush for CTBA does not occur, and a protruding part 66 protruding in response to the shape of the void part 40 are formed.

Furthermore, as shown in FIG. 3, a first recessed groove 12 for instructing the mounting direction of the outer pipe 10 is formed on the outer peripheral surface of the outer pipe 10, and as shown in FIG. 5A, a second recessed groove 62 having the same form as the first recessed groove 12 is also formed on the outer peripheral surface of the disc unit 61.

The inner pipe 20 and the external stopper 60 are engaged with and coupled to each other, in the state of being matched on the basis of the first recessed groove 12 formed in the outer pipe 10 and the second recessed groove 62 formed on the disc unit 61.

That is, the left side of the shown drawing is the front in FIG. 3, whereas the right side of the shown drawing is the front in FIG. 5A.

The external stopper 60 as described above is a portion becoming the design parameter of the trailing arm bush for CTBA, and the designer of the trailing arm bush for CTBA is able to design the trailing arm bush for CTBA which can satisfy both the riding comfort and the handling of the vehicle by modifying the external stopper 60.

Figure 7:
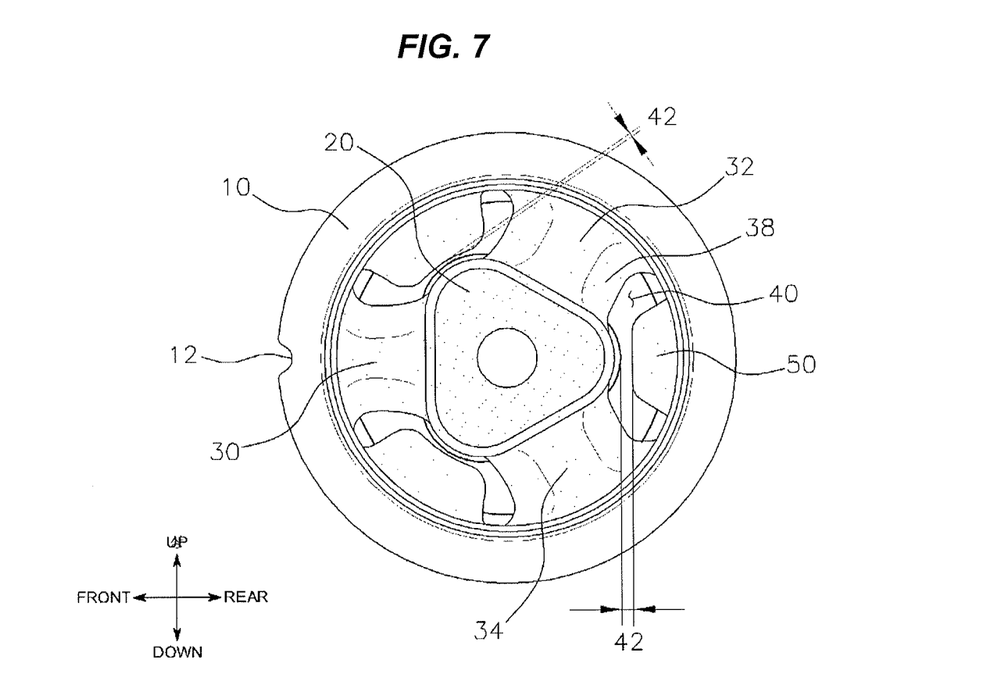
FIG. 7 is a front view illustrating an aspect of a trailing arm bush for CTBA according to another embodiment of the present invention.

FIG. 7 is a front view illustrating an aspect of the trailing arm bush for CTBA according to another embodiment of the present invention.

As shown in FIG. 7, the inner pipe 20 is formed in a triangular pipe form, and each corner of the first bush rubber unit 30 to the third bush rubber unit 34 is preferably formed in the shape of a chamfer 38.

The chamfer 38 refers to a portion that is made by cutting the corners of the member having a square cross-section, unlike a case where the inner pipe 20 is in the form of a circular pipe as described above, when the inner pipe 20 is in the form of a triangular pipe, each corner of the third portion of the first bush rubber unit 30 to the third bush rubber unit 34 is formed in the form of the chamfer 38.

Furthermore, as described above, when the shape of the inner pipe 20 is a circular pipe, the gap 42 between the inner pipe 20 and the stopper 50 is constant in all three directions, whereas as the shape of the inner pipe 20 is changed to the form of the triangular pipe, the gap 42 between the inner pipe 20 and the stopper 50 is also changed.

As shown in FIG. 7, it is preferred that the gap 42 between the inner pipe 20 and the stopper 50 disposed at the rear of the inner pipe 20, i.e., the stopper 50 disposed between the second bush rubber unit 32 and the third bush rubber unit 34 be formed to about 3.2 mm, and the gap 42 between the inner pipe 20 and the stopper 50 disposed above or below the inner pipe 20, i.e., the stopper 50 disposed between the first bush rubber unit 30 and the second bush rubber unit 32, and the stopper 50 disposed between the third bush rubber 34 and the first bush rubber unit 30 be formed to about 1.5 mm.

However, the above-described numerical values are numerical values that are arbitrarily selected as one example, and the gap 42 can be formed by various numerical numbers depending on the type of the vehicle, the shape of the trailing arm bush or the like.

Figure 8A:
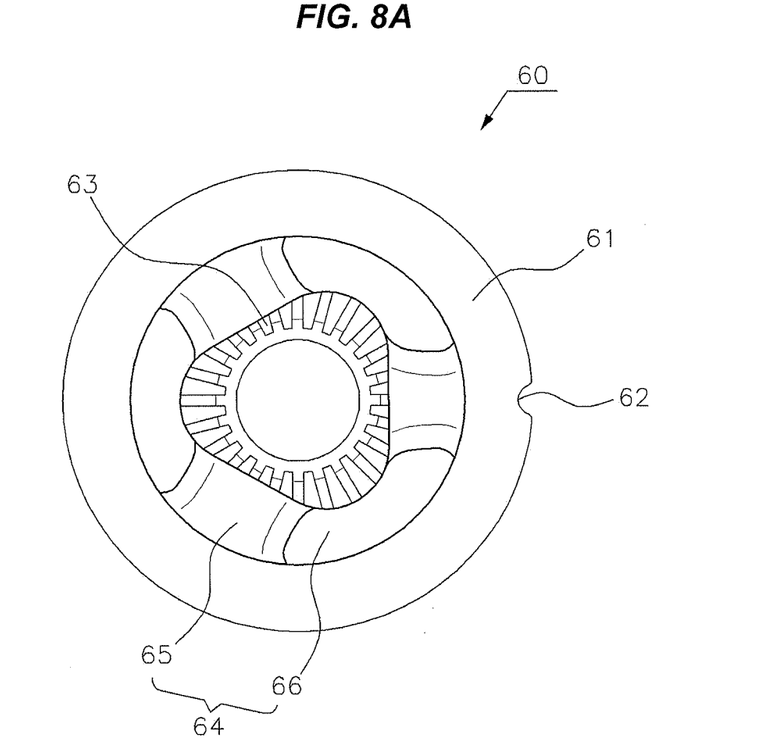
FIG. 8A is a rear view illustrating an aspect of an external stopper according to another embodiment of the present invention.
Figure 8B:
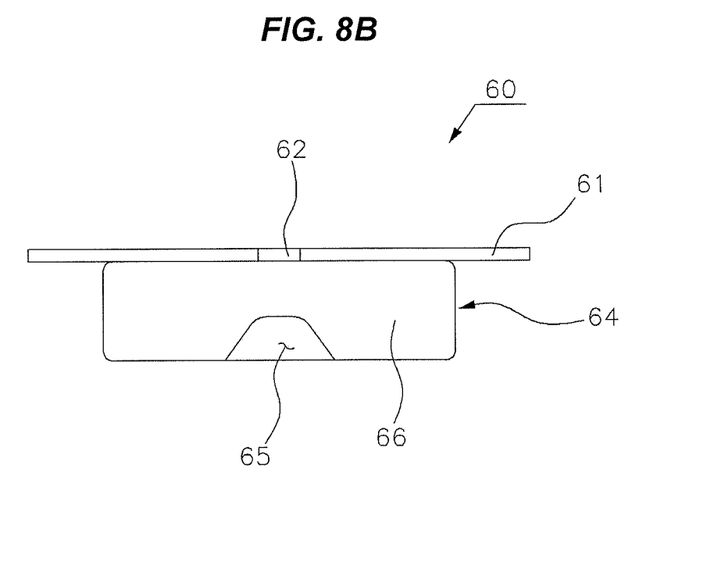
FIG. 8B is a side view showing an aspect of an external stopper according to still another embodiment of the present invention.
Figure 9:
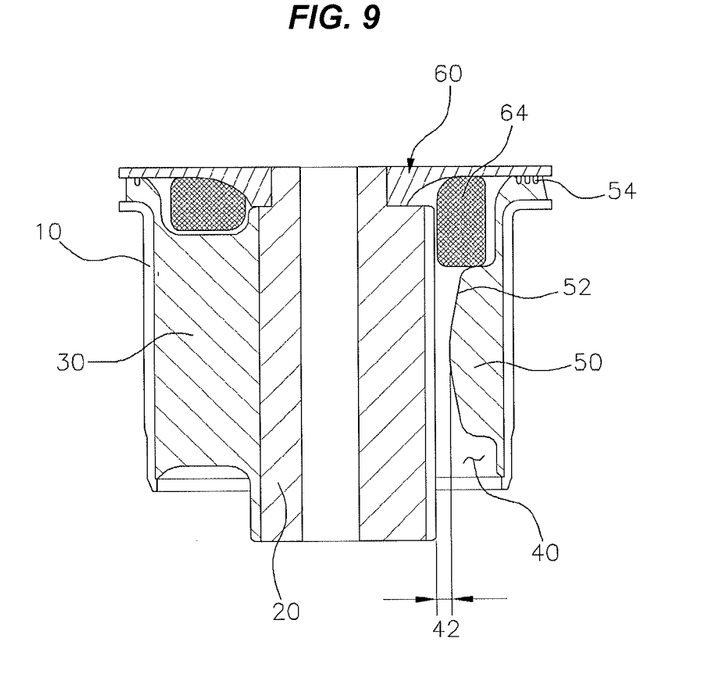
FIG. 9 is a cross-sectional view showing an aspect in which the external stopper is coupled to the trailing arm bush for CTBA according to another embodiment of the present invention.

FIG. 8A is a rear view illustrating an aspect of an external stopper 60 according to another embodiment of the present invention, FIG. 8B is a side view showing an aspect of the external stopper 60 according to another embodiment of the present invention, and FIG. 9 is a cross-sectional view showing an aspect in which the external stopper 60 is coupled to the trailing arm bush for CTBA according to another embodiment of the present invention.

As shown in FIGS. 8A and 8B, the overall shape of the external stopper 60 is similar, regardless of a case where the inner pipe 20 is in the form of a circular pipe, and a case where the inner pipe 20 is in the form of a triangular pipe.

However, there are differences in that the fastening unit 63 of the external stopper 60 is formed in a triangular shape in response to the shape of the inner pipe 20, and the shape of the recessed part 65 is also changed in response to the first bush rubber unit to the third bush rubber unit.

Further, as shown in FIG. 9, it is understood that there is a slight change in the shape of the stopper 50, and first, a gradient surface 52 of approximately 10° is formed from the central portion of the stopper 50.

Referring to FIG. 6, when the inner pipe 20 is a circular pipe, the stopper 50 has the surface of a straight line form, whereas, referring to FIG. 9, when the inner pipe 20 is a triangular pipe, the stopper 50 has a gradient surface 52 of a sloped form.

In addition, the stopper 50 extends to the terminal end of the outer pipe 10 on the inner peripheral surface of the outer pipe 10 and is coupled to the disc unit 61 of the external stopper 60, and at this time, embossed projections 54 are applied to a portion in which the stopper 50 and the external stopper 60 are coupled to each other.

That is, the overall shape of the trailing arm bush for CTBA is similar when the inner pipe 20 is a circular pipe and when the inner pipe 20 is a triangular pipe, but the configuration and the form of the trailing arm bush for CTBA are changed to partially fit the shape of inner pipe 20.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A trailing arm bush for CTBA (Coupled Torsion Beam Axle) that connects between a pair of trailing arms supported by a torsion beam disposed in a vehicle width direction and a vehicle body, comprising:
   a cylindrical outer pipe configured to be coupled to one side of each of the pair of trailing arms;
   an inner pipe inserted to a central portion of the outer pipe at an interval;
   a first bush rubber unit, a second bush rubber unit and a third bush rubber unit that connect between an inner peripheral surface of the outer pipe and an outer peripheral surface of the inner pipe, respectively;
   a hollow void part formed between the inner peripheral surface of the outer pipe and the outer peripheral surface of the inner pipe;
   a stopper attached to the inner peripheral surface of the outer pipe and disposed among the first bush rubber unit, the second bush rubber unit and the third bush rubber unit; and
   an external stopper including a disc unit having a diameter equal to an outer peripheral surface of the outer pipe, and a cylindrical unit coupled to the disc unit and having a relatively smaller diameter than the inner peripheral surface of the outer pipe,
   wherein, when the inner pipe is moved in a front-to-back direction due to external vibration of a vehicle, angles of the first bush rubber unit, the second bush rubber unit and the third bush rubber unit formed together with the inner pipe change,
   wherein the trailing arm bush for the CTBA has characteristics of a non-linear spring,
   wherein the stopper includes a gradient surface formed at a side of the stopper adjacently facing the inner pipe, and
   wherein embossed projections are positioned in contact with the stopper and the external stopper,
   wherein the inner pipe is formed in a triangular pipe shape, and
   wherein each corner of the first bush rubber unit, the second bush rubber unit and the third bush rubber unit is formed in chamfered shape.

2. The trailing arm bush for the CTBA of claim 1,
   wherein a recessed part is recessed in response to shapes of the first bush rubber unit, the second bush rubber unit and the third bush rubber unit; and
   wherein a protruding part protruding in response to a shape of the hollow void part are formed on the cylindrical unit, and
   wherein the recessed part and the protruding part are alternately disposed.

3. The trailing arm bush for the CTBA of claim 1, wherein the first bush rubber unit is disposed in front of the inner pipe.

4. The trailing arm bush for the CTBA of claim 3,
   wherein the second bush rubber unit forms a predetermined angle together with the first bush rubber unit and is disposed above the inner pipe,
   wherein the third bush rubber unit forms a predetermined angle together with the first bush rubber unit and is disposed below the inner pipe, and
   wherein the second bush rubber unit and the third bush rubber unit are disposed vertically symmetrically on a basis of the inner pipe.

* * * * *